No. 606,843. Patented July 5, 1898.
L. MOND.
PROCESS OF AND APPARATUS FOR OBTAINING NICKEL FROM NICKEL-CARBONYL.
(Application filed Jan. 21, 1898.)
(No Model.) 2 Sheets—Sheet 1.
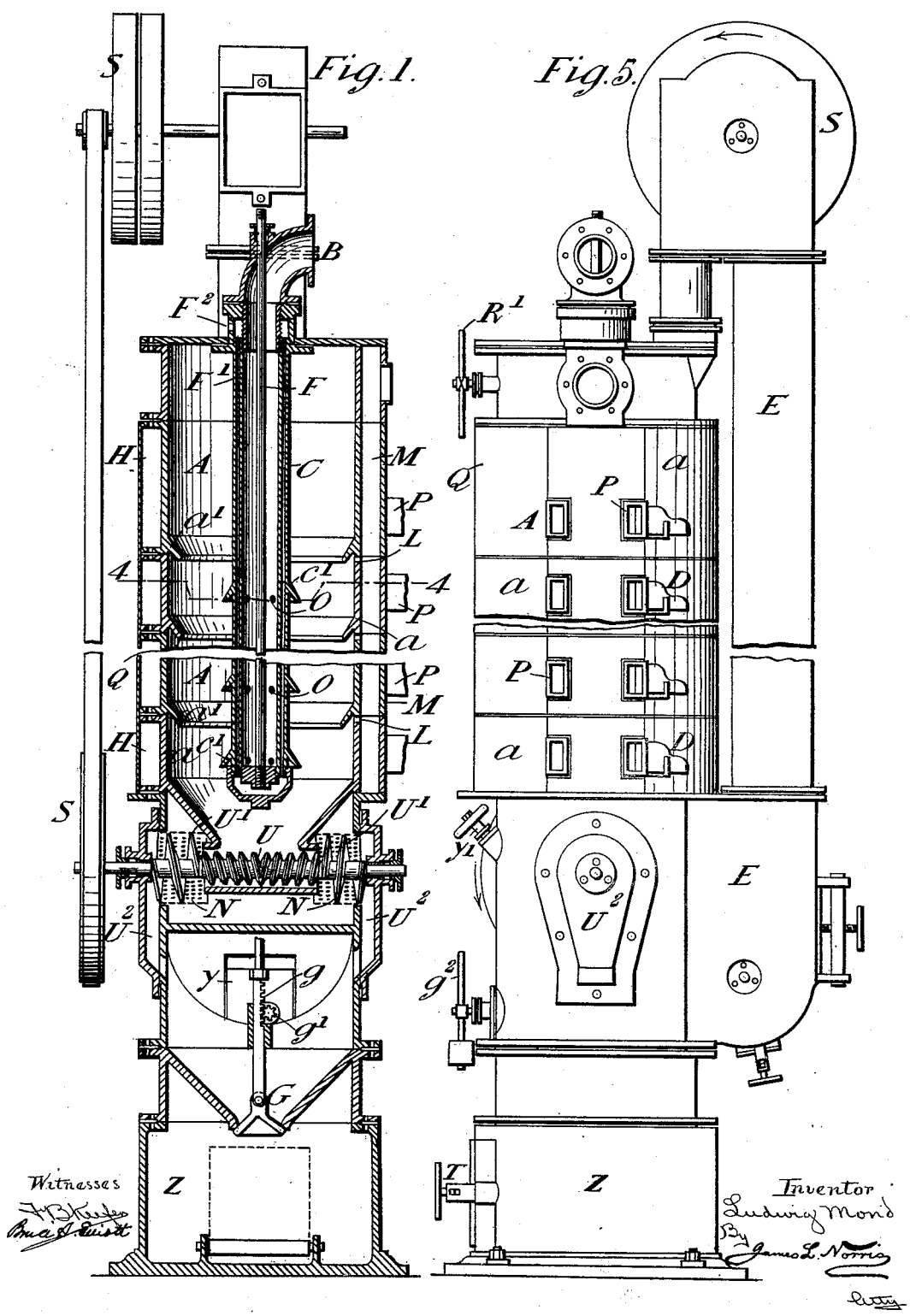

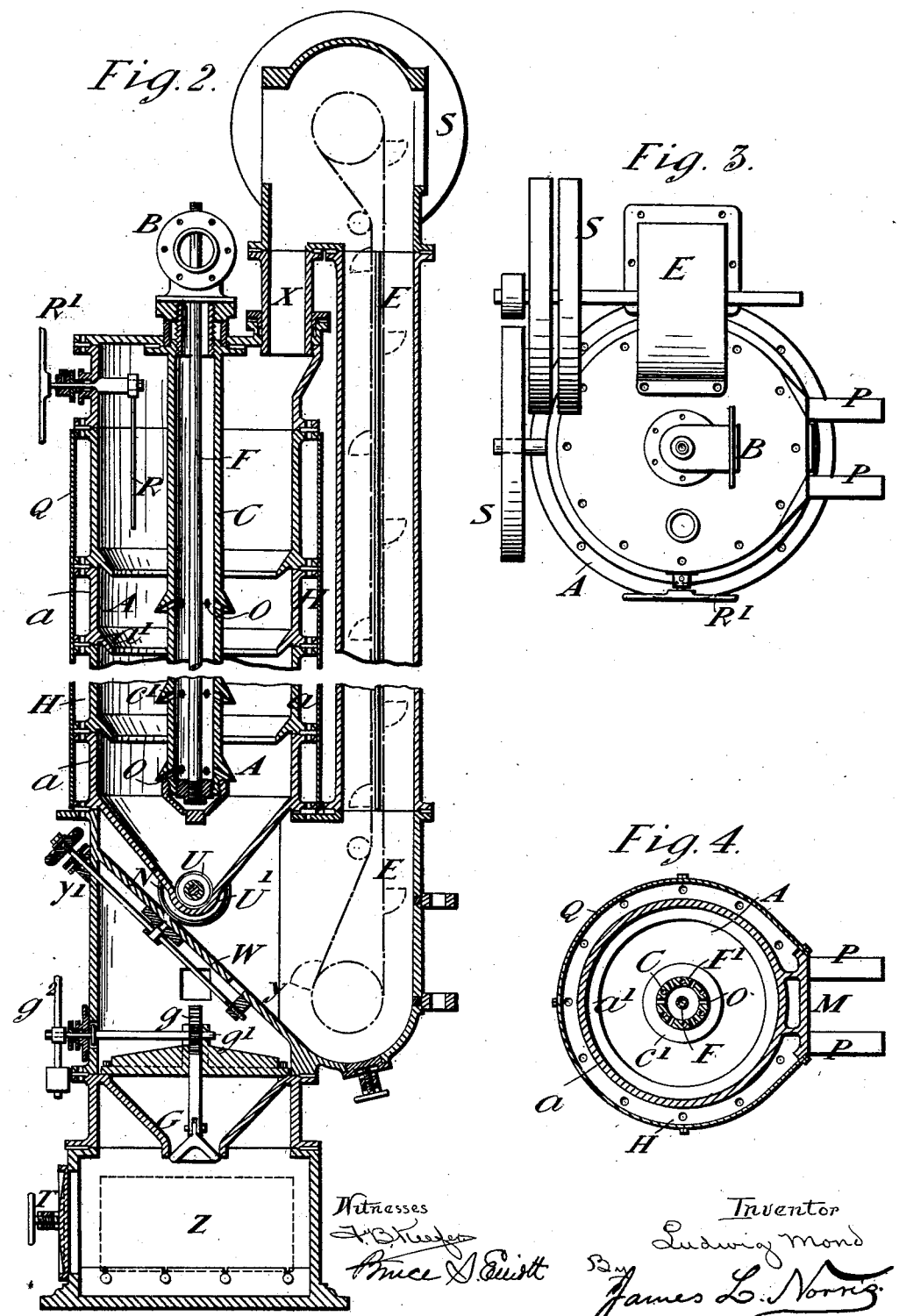

UNITED STATES PATENT OFFICE.

LUDWIG MOND, OF LONDON, ENGLAND.

PROCESS OF AND APPARATUS FOR OBTAINING NICKEL FROM NICKEL-CARBONYL.

SPECIFICATION forming part of Letters Patent No. 606,843, dated July 5, 1898.

Application filed January 21, 1898. Serial No. 667,435. (No model.)

*To all whom it may concern:*

Be it known that I, LUDWIG MOND, residing at No. 20 Avenue road, Regents Park, in the city of London, England, have invented certain new and useful Improvements in Processes of and Apparatus for Obtaining Metallic Nickel from Nickel-Carbonyl, of which the following is a specification.

This invention relates to means of obtaining metallic nickel from nickel-carbonyl in the form of pellets, which are specially suitable in the production of nickel alloys. For this purpose I pass gases containing nickel-carbonyl such as are obtained as described in my United States Patent No. 455,227, of June 30, 1891, through nickel in the form of shot or granules or small fragments, which are kept at the temperature required for the decomposition of the carbonyl, about 200° centigrade. The nickel which thus separates from carbonyl becomes deposited on the shot or granules, which consequently increase in size. In order to prevent cohesion of the shot or granules, I keep them all in motion. When a number of the pellets have acquired convenient size, they are separated by sifting without interrupting the depositing operation, the smaller pellets being returned to receive deposit from nickel-carbonyl.

A convenient form of apparatus for effecting the process described is shown in the accompanying drawings.

Figures 1 and 2 are vertical sections on planes at right angles to each other; Fig. 3, a plan; Fig. 4, a horizontal section taken at 4 4 on Fig. 1, and Fig. 5 a side elevation showing the arrangement of flues for externally heating the apparatus.

A is a cylindrical vessel preferably built up of short cylinders $a$ $a$, bolted together. It contains a central tube C, provided with holes O, through which the gas containing nickel-carbonyl, entering at the gas-inlet B, passes into the vessel which is filled with pellets, shot, or small fragments of nickel. The gas permeates through the interstices between these pellets and is brought into intimate contact with them, becoming decomposed and depositing nickel on them, the gases finally escaping through the outlets L into the gas-exit pipe M. In order to prevent the pellets from being caused to cohere by the deposited nickel, they are all kept slowly moving by continuously withdrawing some of the pellets from the bottom of the cylindrical vessel A by means of a right and left handed worm conveyer U, which delivers the pellets into two sifting-drums N. The smaller pellets fall onto the inclined plane W and collect at the base of the elevator E, which conveys them again to the top of the cylinder A and feeds them through the feeding-hole X. The pellets which are too large to pass through the holes in the screens N are carried by the larger worms U' to channels $U^2$ and fall onto an inclined plane, whence they pass into the nickel-collecting chamber Z through a valved opening G. The nickel is from time to time removed from this chamber Z without interfering with the working of the apparatus by closing the valve G by the rack $g$, pinion $g'$, and external handle $g^2$ and opening the door T. By opening the screw-slide $y$ by means of the handle $y'$ all the nickel can be withdrawn from the apparatus. The worm conveyer U U' and elevator E are driven by suitable gearing from pulleys S.

To prevent choking of the gas inlet and outlet holes and to permit of the free entrance and exit of the gas, deflecting-surfaces $a'$ and $c'$ are arranged on the inside of each section $a$ and on the outside of the central tube C immediately over the gas-outlets L and gas-inlets O.

In order to avoid the deposit of nickel from the nickel-carbonyl in the central tube C, this is kept cool by causing water to circulate down the tube F and up through passages F', formed in the central tube, to the water-outlet $F^2$.

The cylindrical vessel A is surrounded by a wrought-iron casing Q, which forms heating-spaces H, communicating with heating-flues P, so arranged that the temperature of each cylinder $a$ can be separately regulated by the dampers D, so as to maintain the temperature of the nickel pellets contained in the vessel A at about 200° centigrade, at which temperature the nickel-carbonyl is decomposed.

In order to ascertain whether the cylinder A is full of pellets, a rod R is fixed to the spindle of an external handle R', which can be turned partly around, so that the operator by feeling resistance to the motion of the rod R knows that the pellets extend to that height.

I claim—

1. The herein-described process of separating metallic nickel from nickel-carbonyl, which consists in passing gases containing nickel-carbonyl through interstices between heated pellets or small pieces of nickel, whereby the carbonyl is decomposed and the nickel deposited on said pellets, and slowly moving the said pellets to keep them from cohering, substantially as described.

2. In apparatus for separating metallic nickel from nickel-carbonyl, the combination of a vessel for receiving nickel pellets or fragments, means for heating said vessel, a perforated tube extended into the vessel for introducing therein gases containing nickel-carbonyl to pass through interstices between the heated nickel pellets, means for cooling said tube, and conveyer and sifting mechanism for continuously withdrawing the pellets from the bottom of the vessel and returning those of small size at the top to keep the pellets in motion and prevent them from cohering as they become enlarged by deposit of nickel upon them, substantially as described.

In testimony whereof I have hereunto set my hand in presence of two subscribing witnesses.

LUDWIG MOND.

Witnesses:
ROBERT B. HANDLEY,
AUGUSTO FRANCINI.